United States Patent
Lhost et al.

(10) Patent No.: US 10,696,774 B2
(45) Date of Patent: Jun. 30, 2020

(54) PROPYLENE COPOLYMER FOR BOPP HEAT SEAL FILM LAYERS

(71) Applicant: TOTAL RESEARCH & TECHNOLOGY FELUY, Seneffe (BE)

(72) Inventors: Olivier Lhost, Havré (BE); Aurélien Vantomme, Mignault (BE); Alexandre Welle, Court-St-Etienne (BE)

(73) Assignee: TOTAL RESEARCH & TECHNOLOGY FELUY, Seneffe (BE)

( * ) Notice: Subject to any disclaimer, the term of this patent is extended or adjusted under 35 U.S.C. 154(b) by 490 days.

(21) Appl. No.: 14/903,302

(22) PCT Filed: Jul. 9, 2014

(86) PCT No.: PCT/EP2014/064729
§ 371 (c)(1),
(2) Date: Jan. 7, 2016

(87) PCT Pub. No.: WO2015/004193
PCT Pub. Date: Jan. 15, 2015

(65) Prior Publication Data
US 2016/0376393 A1    Dec. 29, 2016

(30) Foreign Application Priority Data

Jul. 9, 2013  (EP) ................... 13175745

(51) Int. Cl.
| | | |
|---|---|---|
| *C08F 210/06* | (2006.01) | |
| *C08F 293/00* | (2006.01) | |
| *B32B 27/08* | (2006.01) | |
| *B32B 27/32* | (2006.01) | |
| *C08F 4/6592* | (2006.01) | |
| *C08F 4/659* | (2006.01) | |

(52) U.S. Cl.
CPC ............ *C08F 293/00* (2013.01); *B32B 27/08* (2013.01); *B32B 27/32* (2013.01); *C08F 210/06* (2013.01); *B32B 2307/518* (2013.01); *B32B 2581/00* (2013.01); *C08F 4/65912* (2013.01); *C08F 4/65916* (2013.01); *C08F 4/65927* (2013.01)

(58) Field of Classification Search
CPC ...... C08F 210/06; C08L 23/14; C08L 23/142; C08L 2205/025; B32B 27/08; B32B 27/32
See application file for complete search history.

(56) References Cited

U.S. PATENT DOCUMENTS

| | | |
|---|---|---|
| 2003/0130443 A1 | 7/2003 | Suhm et al. |
| 2006/0058463 A1 | 3/2006 | Fuchs et al. |
| 2010/0152382 A1 | 6/2010 | Jiang et al. |

FOREIGN PATENT DOCUMENTS

| | | |
|---|---|---|
| EP | 1270651 A1 | 1/2003 |
| EP | 1588843 A1 | 10/2005 |
| EP | 1661924 A1 | 5/2006 |

OTHER PUBLICATIONS

Plastics Additives Handbook, ed. H. Zweifel, 5th edition, 2001, Hanser Publishers.
G.J. Ray et al., "Carbon-13 Nuclear Magnetic Resonance Determination of Monomer Composition and Sequence Distributions in Ethylene-Propylene Copolymers Prepared with a Stereoregular Catalyst System", Macromolecules, vol. 10, n° 4, Jul.-Aug. 1977, p. 773-778.
Y.D Zhang et al, "13C NMR, GPC, and DCS Study on a Propylene-ethylene-1-butene Terpolymer Fractionated by Termperature Rising Elution Fractionation" Polymer Journal, vol. 35, n°7, 2003, p. 551-559.
International Search Report issued in PCT/EP2014/064729, dated Sep. 3, 2014, 3 pages.

*Primary Examiner* — Roberto Rabago
(74) *Attorney, Agent, or Firm* — Albert Shung

(57) ABSTRACT

A propylene-comonomer block copolymer may have a molecular weight distribution Mw/Mn of at least 1.7, a percentage of enthalpy measured between Ti and [Tm−18° C.] of at least 20% of the total enthalpy, and a ratio E1/Co of at least 0.80. The propylene-comonomer block copolymer may be produced by polymerizing propylene in the presence of at least one comonomer and a bridged metallocene catalyst. The bridged metallocene catalyst may include bridged fluorenyl, bridged indenyl metallocene, or any combination thereof. The propylene-comonomer block copolymer may be used as a heat seal layer for biaxially oriented multi-layer films.

13 Claims, 4 Drawing Sheets

PROPYLENE COPOLYMER FOR BOPP HEAT SEAL FILM LAYERS

CROSS-REFERENCE TO RELATED APPLICATIONS

This application is a National Stage Entry of PCT/EP2014/064729, filed on Jul. 9, 2014; which claims priority to EP 13175745.2, filed on Jul. 9, 2013; the entireties of which are incorporated herein by reference.

FIELD OF THE INVENTION

The present invention generally relates to a propylene-comonomer block copolymer suitable for use as heat seal layer for biaxially oriented multi-layer films.

BACKGROUND

Biaxially oriented multi-layer polypropylene (BOPP) films are known to comprise a homopolypropylene layer which is sandwiched between two thin skin layers. Said skin layers provide surface properties to the BOPP film. They could correspond to the same grade as the core layer but with an appropriate formulation (e.g. with anti-block additives). They could also correspond to a polypropylene comprising at least one comonomer when sealing properties are required. In the latter case, said skin layers are also called heat seal layers.

Continuous efforts are made in order to have improved BOPP heat seal layers. The optimal desired product will ideally have a combination of characteristics consisting in having low seal initiation temperature that do not lead to sticking on the rolls during BOPP production (in a tenter process); having good hot tack properties to allow the use of the BOPP film having the heat seal layer in a vertical-form-fill-seal packaging system in the broadest possible range of temperature and speed; having low xylene solubles and/or hexane solubles content to use the BOPP film with the heat seal layer in food packaging according to the legislation in force for food packaging; having good optical properties such as high transparency, low haze and high gloss; improved resistance to scratch, having good slip properties, good anti-block properties, good anti-static properties, good printability properties and good aptitude to metallization.

EP 1 588 843 discloses a polyolefin based biaxially oriented multi-layer film having at least one surface layer comprising a propylene-ethylene random copolymer which is obtained through sequential polymerization catalyzed by a metallocene component. In such sequential polymerization, the propylene-ethylene random copolymer component produced in the first step has an ethylene content of 1 to 7 wt % and the propylene-ethylene random copolymer component produced in the second step has an ethylene content of 6 to 15 wt % higher than that of the polymer component obtained in the first step. The propylene-ethylene random copolymer has a high melt flow rate of at least 16 g/10 min, which increases the risk of heat seal layer thickness issues when used in a multi-layer BOPP production. In addition, the resin used for the production of said films comprises high xylene solubles content.

EP 1 270 651 discloses a polymer film comprising a propylene random copolymer with the comonomer being ethylene or an alpha-olefin having at least four carbon atoms and a total comonomer content of 4.5 to 12 mol % wherein the sealing initiation temperature SIT of the film is the melting temperature (Tm)—30 DEG C. or less, preferably (Tm)—33 DEG C. or less and the xylene solubles is from 4 to 15 wt %, preferably from 6 to 10 wt %. The melting temperature Tm of the copolymer is 135 DEG C. or higher.

For most applications of BOPP heat seal layers, high hexane solubles content is not desired. For instance, in food packaging, the hexane solubles content should be low in order to be in conformity with the legislation.

It is an object of the present invention to provide a propylene-comonomer block copolymer for use as heat seal layer thus that the heat seal layer have low seal initiation temperature.

It is another object of the present invention to provide a propylene-comonomer block copolymer having low hexane solubles content.

It is another object of the present invention to provide a propylene-comonomer block copolymer for use as heat seal layer designed to provide a good compromise between low hexane solubles content and low seal initiation temperature.

It is another object of the present invention to provide a propylene-comonomer block copolymer for use as heat seal layer, designed to provide a good compromise between low hexane solubles content, low seal initiation temperature and good results in stickiness.

It is another object of the present invention to provide a heat seal layer having improved optical properties.

It is another object of the present invention to provide a heat seal layer having improved hot tack properties and surface treatment retention.

SUMMARY OF THE INVENTION

The present invention provides a propylene-comonomer block copolymer having a molecular weight distribution Mw/Mn of at least 1.7; a percentage of enthalpy measured between Ti and [Tm−18° C.] of at least 20% of the total enthalpy, wherein the total enthalpy is determined by stepwise isothermal segregation technique SIST, Ti is the initial melting temperature and Tm is the melting temperature, and a ratio E1/Co of at least 0.80, wherein said ratio is determined by 13C-NMR analysis and is the molar fraction of ethylene comonomer in sequences of length 1 relative to the total comonomer content and wherein the sequences of length 1 correspond to the following structures

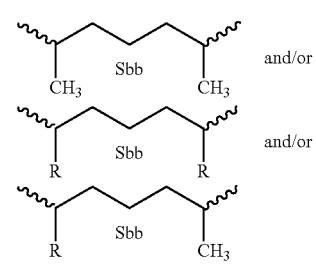

wherein R is the lateral chain appearing in the polypropylene chain after insertion of a comonomer other than ethylene, i.e. R is $C_nH_{2n+1}$ wherein n is at least 2.

In a second aspect, the present invention provides a process for the production of a propylene-comonomer block copolymer as described above, wherein propylene is polymerized in the presence of a comonomer and a bridged metallocene catalyst selected from the group comprising bridged fluorenyl and bridged indenyl metallocene or any combination thereof. Indeed, surprisingly it was found that the use of a metallocene catalyst allows the production of clean C3C2-C3C2 block heat seal layer grades having very low hexane solubles content. It has been found that the propylene-comonomer block copolymer produced by metallocene catalysts have hexane solubles content lower that the propylene-comonomer block copolymer produced by Ziegler-Natta catalysts.

In a third aspect, the present invention relates to the use of a propylene-comonomer block copolymer as described above as heat seal layer for biaxially oriented multi-layer films.

DESCRIPTION OF THE FIGURES

FIG. 1 is specific for every catalyst—or blend of catalysts—and has to be re-established after every catalyst change.

DETAILED DESCRIPTION OF THE INVENTION

Figure 1:
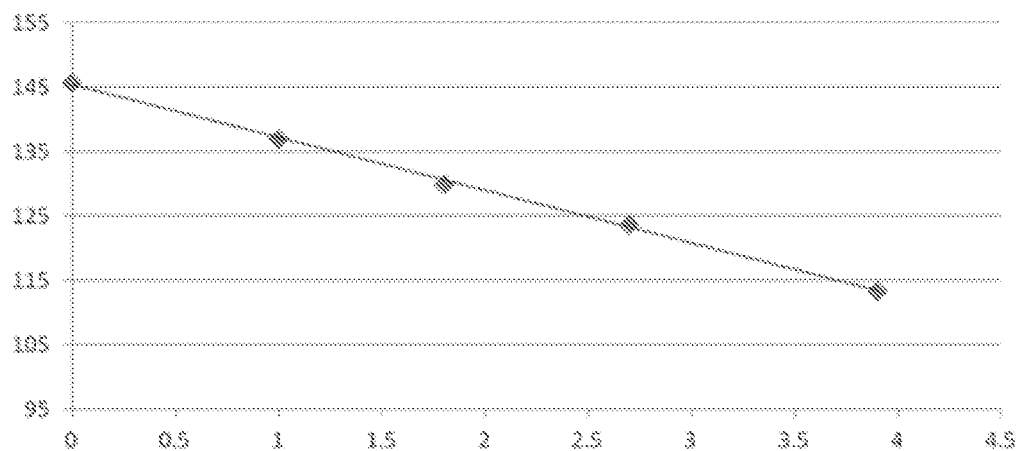
FIG. 1 shows an example of determination of the melting temperature Tm of the second propylene-comonomer block. The figure shows the evolution of the Tm in function of the wt % of ethylene—determined by NMR—in a propylene-ethylene copolymer produced in one single reactor. The melting temperature of said second propylene comonomer block is deduced from the knowledge of the polymerization conditions, associated comonomer incorporation and use of FIG. 1.

The present invention relates to a propylene-comonomer block copolymer suitable for use as heat seal layer for biaxially oriented multi-layer films.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−1096 or less, more preferably +/−5% or less, even more preferably +/−196 or less, and still more preferably +/−0.1% or less of and from the specified value, in so far such variations are appropriate to perform in the disclosed invention. However, it is to be understood that the value to which the modifier "about" refers is itself also specifically disclosed.

"Comprise," "comprising," and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The recitation of numerical ranges by endpoints includes all numbers and fractions subsumed within that range, as well as the recited endpoints.

The expression "% by weight" (weight percent), here and throughout the description unless otherwise defined, refers to the relative weight of the respective component based on the overall weight of the formulation.

The expressions "skin layer" and "heat seal layer" are used herein as synonyms.

"Seal-initiation temperature" used herein refers to the minimum sealing temperature required to form a seal of significant strength. The level of strength that must be reached to be deemed "significant" varies with the application. As a default value, 0.50 N (ca. 50 gm force) as minimum sealing force between two films, 1.5 cm width each, is commonly used.

In a first aspect, the present invention provides a propylene-comonomer block copolymer, which is a propylene-comonomer multimodal copolymer. With preference, the propylene-comonomer block copolymer is a propylene-comonomer bimodal copolymer i.e. with a bimodal distribution of the comonomer. The present invention provides therefore a propylene-comonomer block copolymer which comprises at least 40 wt % of a first propylene-comonomer polymer and at least 30 wt % of a second propylene-comonomer polymer, the first and the second propylene comonomer differing in their comonomer content. The comonomer content of the second propylene-comonomer polymer is higher than the comonomer content of the first propylene-comonomer polymer. This allows reaching low SIT value when the final product will be used as BOPP skin layer. Block polymer means that the final polymer will correspond to a blend of, at least, two polymers produced in different polymerization conditions; each polymer, also called block, has thus specific properties. Accordingly, the mentioned at least two polymers or blocks do not necessarily belong to the same molecule, in a preferred embodiment, the propylene-comonomer block copolymer is suitable for use as heat seal layer for biaxially oriented multi-layer films.

In a preferred embodiment, the propylene-comonomer block copolymer comprises at most 70 wt % of said first propylene-comonomer polymer.

In a preferred embodiment, the propylene-comonomer block copolymer comprises at most 60 wt % of said second propylene-comonomer polymer.

In a preferred embodiment, the comonomer is ethylene and the propylene-comonomer block copolymer comprises at least two propylene-ethylene copolymers having different ethylene content, wherein the ethylene content of the second propylene-ethylene copolymer is from 1 to 5 wt % higher than that of the ethylene content of the first propylene-ethylene copolymer.

It is known that the melting temperature of the propylene-comonomer polymer is dependant of the comonomer content of said propylene-comonomer polymer, such that an increase of the comonomer content leads to a decrease of the melting temperature and vice-versa. In the invention, the fact that the comonomer content of one of the propylene-comonomer polymer is higher than the comonomer content of the other propylene-comonomer polymer result in having two propylene-comonomer polymers with different melting temperatures. Thus to adjust the melting temperature of one of the propylene-comonomer polymer component or of the resulting propylene-comonomer block copolymer, an adjustment of the comonomer content of said propylene-comonomer polymer component or of at least one of the propylene-comonomer polymer component of the propylene-comonomer block copolymer is to be done.

In a preferred embodiment, the melting temperature of the first propylene-comonomer block is at least 90° C., preferably at least 100° C., more preferably at least 110° C., most preferably at least 120° C. The melting temperature of said first propylene-comonomer block is at most 160° C., preferably at most 150° C., more preferably at most 145° C.

In a preferred embodiment, the melting temperature of the second propylene-comonomer block is at most 135° C., preferably at most 130° C., more preferably at most 125° C., even more preferably at most 120° C., most preferably at most 115° C., even most preferably at most 100° C. The melting temperature of the second propylene-comonomer block is at least 60° C., preferably at least 70° C., more preferably at least 80° C. The melting temperature of the second propylene-comonomer block is determined, as shown in FIG. 1, from the calculated ethylene content in the second propylene-comonomer block using the following experimental equation (I):

$$Tm\ (°\ C.) = -8.2 \times (\text{calculated wt \% ethylene in second propylene-comonomer block}) + 145.4$$

The calculated wt % ethylene n second propylene-comonomer block is determined via the following equation (II):

wt % ethylene in second propylene-comonomer block=(100 wt % total ethylene content−(wt % ethylene in first propylene-comonomer block*wt % polymer produced in the first reactor))/wt % polymer produced in the second reactor.

It is to be understood that the above presented determination of Tm is specific for the catalyst used in the examples of the present invention. Other catalysts are suitable to be used for the production of propylene-comonomer block copolymer as described in the present invention. However, for said other catalysts and/or for comonomers other than ethylene, equation (I) and FIG. 1 are no longer valid for the determination of the Tm of the second propylene-comonomer block. For other catalysts and/or for comonomers other than ethylene, the figure equivalent to FIG. 1 has to be re-established based on properties measured on single blocks specifically produced in a reactor.

In a preferred embodiment, the comonomer content of the propylene-comonomer block copolymer is at least 0.1 wt %, preferably at least 1 wt %, more preferably at least 1.5 wt %, most preferably at least 2 wt %. Said comonomer content is at most 15 wt %, preferably at most 10 wt %, preferably at most 9 wt % more preferably at most 8 wt %, most preferably at most 5 wt %. In a preferred embodiment, said comonomer is selected from the group comprising ethylene, butene, pentene, hexene, heptene, octene, nonene, decene and any mixture thereof. Preferably, at least 80%, preferably at least 90%, more preferably 95% and most preferably 99% of said comonomer is ethylene. In a further preferred embodiment, said comonomer consists of ethylene.

The propylene-comonomer block copolymer may further contain at most 10 wt %, preferably at most 5 wt %, more preferably at most 3 wt %, most preferably at most 1 wt %, of another comonomer. Said another comonomer might be comprised in the first propylene-comonomer block or in the second propylene-comonomer block. Preferably said another comonomer is butene or hexene. In a further preferred embodiment, the propylene-comonomer block copolymer is devoid of butene.

In a preferred embodiment, the melt flow index (MFI) of the propylene-comonomer block copolymer is at least 0.1 g/10 mm, at least 1 g/10 min, preferably at least 3 g/10 min. In a preferred embodiment, the melt flow index (MEI) of the propylene-comonomer block copolymer is at most 15 g/10 min, preferably at most 10 g/10 min.

In a preferred embodiment, the seal initiation temperature of the propylene-comonomer block copolymer is at least 60° C., preferably at least 70° C. The seal initiation temperature of the propylene-comonomer block copolymer is at most 140° C., preferably at most 130° C., more preferably at most 125° C., even more preferably at most 120° C.

In a preferred embodiment, the melting temperature of the propylene-comonomer block copolymer is at least 100° C., preferably at least 110° C., more preferably at least 120° C. Said melting temperature is at most 150° C., preferably at most 145° C.

In a preferred embodiment, the molecular weight distribution of the propylene-comonomer block copolymer, represented by the ratio Mw/Mn as determined by gel permeation chromatography (GPC), of the propylene-comonomer block copolymer is at least 1.7, preferably at least 2, more preferably at least 2.3. Mw/Mn is at most 8, preferably at most 6, more preferably at most 5, even more preferably at most 4.

In a preferred embodiment, the propylene-comonomer block copolymer is having a hexane solubles content of at most 2 wt %, preferably at most 1.5 wt %, more preferably at most 1 wt %, most preferably at most 0.8 wt %, even most preferably at most 0.5 wt %.

The percentage of enthalpy measured between Ti and [Tm−18° C.], of the propylene-comonomer block copolymer is at least 20%, preferably at least 22% of the total enthalpy. Said percentage is at least 20% when the propylene-comonomer block copolymer comprises at least two polymer components having different comonomer content in suitable proportion. Thus to achieve the desired percentage, the man skilled in the art can adjust the comrnoner content of the propylene-comonomer polymers in the different blocks of the propylene-comonomer block copolymer.

The percentage of enthalpy measured between Ti and [Tm−18° C.] of the propylene-comonomer block copolymer of at least 20%, preferably at least 22% of the total enthalpy quantifies that the DSC signal extends over a range of especially high temperatures.

The percentage of enthalpy measured between Ti and [Tm−18° C.], of the propylene-comonomer block copolymer is at most 40%, preferably at most 50%, more preferably at most 55%, even more preferably at most 60%, most preferably at most 70% of the total enthalpy. Said percentage of enthalpy measured between Ti and [Tm−18° C.] being determined by stepwise isothermal segregation technique (SIST)

The percentage of enthalpy between Ti and [Tm−18° C.] is determined using the Stepwise Isothermal Segregation Technique (SIST). The precise analytical procedure is described in the "test methods" section. From the SIST obtained data, the percentage of enthalpy between Ti and [Tm−18° C.] is calculated using the following equation (III):

Melting enthalpy below $[Tm-18\ C.] =$ (III)

$$\frac{\int_{Ti}^{Tm-18\ C} \text{Heat Flux} dT}{\int_{Ti}^{Te} \text{Heat Flux} dT} * 100$$

Wherein:
Ti is the initial melting temperature of the propylene-comonomer block copolymer. To determine this value, the following procedure is used: the part of the SIST curve after complete melting is rotated to horizontal. Then the base line is drawn horizontally from the end of the thermogram. The initial melting temperature is the cross-over point between the baseline and the thermogram;
Te is the end melting temperature so the temperature at the junction between the thermogram and the baseline above the melting temperature;
The melting temperature Tm is the temperature at the maximum of the peak. From this value, the temperature corresponding to [Tm−18 C] could be calculated by subtraction of 18 C;
The "heat flux" is provided by the SIST analysis. It is the power used to melt the polymer sample during the melting process. This power is divided by the mass of the polymer (unit is thus W/g);
To express this enthalpy between Ti and [Tm−18 C] in "percentage", the ratio of the two integrals is multiplied by 100.

To obtain enthalpies in the numerator and denominator of the above-equation, the proposed integrals must be divided by the heating rate. Doing so, enthalpies, in J/g, are obtained, both in the numerator and denominator. As division by the heating rate must be performed both in the numerator and in the denominator, these divisions could be simplified and they were not performed during the calculation of the percentage of enthalpy between Ti and [Tm−18 C].

Figure 2:
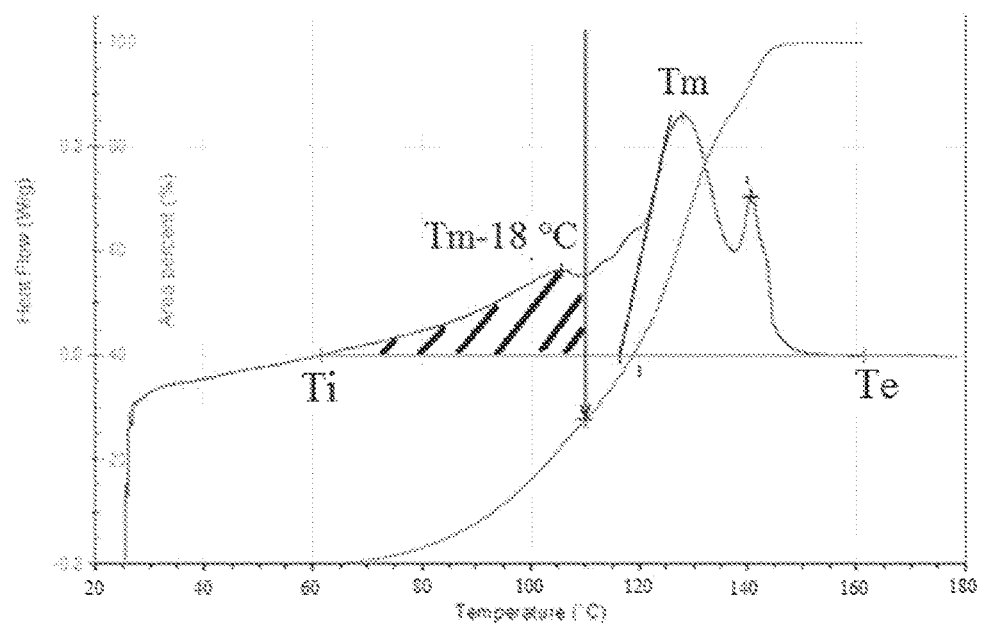
FIG. 2 shows an example of determination of the percentage of enthalpy measured between Ti and [Tm−18° C.] according to an embodiment of the present invention.

FIG. 2 shows an example of the experimental result: the dashed part corresponds to the integration of Pleat Flux $[\int_{Ti}^{Tm-18\ C}\text{Heat Flux dT}]$. After division by the integration of the whole thermogram $[\int_{Ti}^{Te}\text{Heat Flux dT}]$ and multiplication of this ratio by 100, the percentage of enthalpy between Ti and [Tm−18 C] is obtained.

In a preferred embodiment, the propylene-comonomer block copolymer further comprises additional polymer blocks produced during a prepolymerization step. In a preferred embodiment, the propylene-comonomer block copolymer comprises at most 20 wt %, preferably at most 10 wt %, more preferably at most 5 wt %, more preferably at most 2 wt % of the additional blocks produced during said prepolymerization step. Most preferably said additional polymer block consist of propylene.

The first propylene-comonomer copolymer can be produced in one reactor. Said first propylene-comonomer copolymer can also be produced in a cascade of reactors wherein polymerization conditions such as hydrogen content, polymerization temperature may differ from one reactor to the other. Similarly, the second propylene-comonomer copolymer can be produced in one reactor. Said second propylene-comonomer copolymer can also be produced in a cascade of reactors wherein polymerization conditions such as hydrogen content, polymerization temperature may differ from one reactor to the other.

In a preferred embodiment, the propylene-comonomer block copolymer comprises at least one antioxidant and/or other additives selected from the group comprising slip-agent, anti-block agent, light stabilizers, acid scavengers, lubricants, antistatic additives, nucleating/clarifying agents, colorants. An overview of such additives may be found in Plastics Additives Handbook, ed. H. Zweifel, 5$^{th}$ edition, 2001, Hanser Publishers.

The propylene-comonomer block copolymer according to an embodiment of the invention is used as heat seal layer of BOPP films. In another embodiment, the propylene-comonomer block copolymer is blended with polybutene or syndiotactic polypropylene and the obtained blend is used as heat seal layer for BOPP films. This embodiment allows, for example, lowering the SIT temperature, but will results in poorer results regarding stickiness and hexane soulbles content.

In a preferred embodiment, a BOPP film comprises at least one heat seal layer. Preferably said BOPP film comprises an inner layer sandwiched between at least two heat seal layers. Preferably said heat seal layers consists of the propylene-comonomer block copolymer according to an embodiment of the present invention. In preferred embodiment, said heat seal layer has a thickness of from 0.5 to 3 µm, preferably of from 0.6 to 2 µm, more preferably from 0.8 to 1.5 µm, most preferably about 1 µm.

In a second aspect, the present invention provides a process for the production of a propylene-comonomer block copolymer by polymerization of propylene and a comonomer in presence of a bridged metallocene catalyst wherein said comonomer is selected from the group comprising ethylene, butene, pentene, hexene, heptene, octene, nonene, decene and any mixture thereof. Preferably, at least 80%, preferably at least 90%, more preferably 95% and most preferably 99% of said comonomer is ethylene. In a further preferred embodiment, said comonomer consists of ethylene.

In embodiment of the invention, the metallocene catalyst is a single site catalyst, preferably a blend of at least two single site metallocene catalysts. In another embodiment of the invention, the metallocene catalyst is a multi sites catalyst, preferably a bi-sites catalyst, or a blend of at least two multi sites metallocene catalysts.

In a preferred embodiment, said catalyst comprises a metallocene and an activating agent, or alternatively the metallocene catalyst may comprise a metallocene, an activating agent and a support. Such metallocene-based polymerization catalysts are generally known in the art.

The term "bridge" is widely used in metallocene chemistry to denote a chemical group that "bridges", i.e. is bonded simultaneously to for example two substituted cyclopentadienyl ligands or two substituted fluorenyl ligands or a substituted cyclopentadienyl ligand and a substituted fluorenyl ligand.

In a preferred embodiment, the metallocene catalyst is a single site metallocene catalyst selected from the group comprising bridged fluorenyl and bridged indenyl metallocene. In a preferred embodiment, the used metallocene is selected from the group comprising (rac)-dimethylsilyl-bis-(2-methyl-4-phenylindenyl) zirconium dichloride and diphenylmethane(2-Me-4-tBu-cyclopentadiene-1-yl)(2,7-di-t-butylfluorene-9-yl)zirconium dichloride. In another preferred embodiment the metallocene catalyst is a blend of (rac)-dimethylsilyl-bis-(2-methyl-4-phenylindenyl) zirconium dichloride and diphenylmethane(2-Me-4-tBu-cyclopentadiene-1-yl)(2,7-di-t-butylfluorene-9-yl)zirconium dichloride.

In another embodiment, the metallocene catalyst is a bi-site metallocene catalyst. A bi-site metallocene catalyst according to the invention is a catalyst with two sites wherein the sites have different response to comonomer incorporation, such as to produce a propylene-comonomer block copolymer with a bimodal comonomer distribution. In a preferred embodiment, the used metallocene is a combination of (rac)-dimethylsilyl-bis-(2-methyl-4-phenylindenyl) zirconium dichloride and diphenylmethane(2-Me-4-tBu-cyclopentadiene-1-yl)(2,7-di-t-butylfluorene-9-yl) zirconium dichloride.

The catalysts used in the invention allow obtaining the desired block structure, in particular, when comonomer is ethylene, the desired C3C2-C3C2 block structure.

The catalysts used in the invention allow obtaining a ratio E1/Co of at least 0.80 in contrast to Ziegler-Natta catalysts.

The polymerization process can be carried out in one reactor using a blend of single site catalyst having different responses to comonomer incorporation or with a multi site catalyst, preferably a bi-site catalyst wherein the different sites have different responses to comonomer incorporation. Indeed, the propylene-comonomer block copolymer produced must have a multimodal, preferably bimodal, comonomer distribution. A suitable multimodal comonomer distribution in accordance with the invention is achieved with a percentage of enthalpy measured between Ti and [Tm−18° C.] of at least 20% of the total enthalpy.

Preferably, said process can be performed in at least two sequential polymerization reactors using a single site catalyst or a blend of single site catalysts. It is possible according to the invention to use the same catalyst system in all polymerization reactors, the multimodal comonomer distribution being achieved in varying the comonomer feed in said reactors (when single site metallocene catalysts are used) or with the same comonomer feed in said reactors (when bi-sites metallocene catalysts are used). The reactors can be two bulk reactors, two gas phase reactors or a bulk reactor followed by a gas phase reactor. If more than two reactors are used, all employed reactors can be gas phase reactors or bulk reactors or a combination of one or more bulk reactors followed by one or more gas phase reactors.

For the purpose of the present invention, the use of a cascade of reactors is preferred over a post-reactor blend of separately produced propylene-comonomer blocks. Preferably, when single site metallocene catalysts are used, the propylene-comonomer polymer having the highest melting temperature, i.e. the lowest comonomer content, is produced in the first reactor.

In a preferred embodiment, the process comprises an optional pre-polymerization step. This is advantageous as it allows avoiding morphology issues.

In a third aspect, the present invention provides for the use of a propylene-comonomer block copolymer of the invention as heat seal layer for biaxially oriented multi-layer films.

The propylene-comonomer block copolymer of the present invention presents several advantages such as having low SIT value while maintaining high melting temperature; having superior hot tack properties compared to existing terpolymer heat seal layer grades with similar SIT, melting temperature and optical properties; having low hexane solubles content or at least similar to the lowest commercial hexane solubles content. Further good optical properties are obtained.

The propylene-comonomer block copolymer of the present invention is further characterized by a very good aptitude to corona treatment or flame treatment, especially when high surface tension is targeted. Furthermore, the propylene-comonomer block copolymer of the present invention provides access to high surface tension, typically higher than 40 mN/m, at high speed production lines, meaning e.g. for a "Tenter" BOPP lines, a line speed higher than 400 or 450 m/min.

Test Methods

The melt flow index was measured according to norm ISO 1133, condition L, using a weight of 2.16 kg and a temperature of 230° C.

The molecular weight (weight average molecular weight Mw, number average molecular weight Mn, and Z average molecular weight Mz) of the samples is measured using gel permeation chromatography (GPC). The samples are dissolved in 1,2,4-trichlorobenzene. The resulting solution is injected into a gel permeation chromatograph and analyzed under conditions well-known in the polymer industry.

The total ethylene content (wt % C2) relative to the total weight of the propylene polymer and the molar fraction of ethylene comonomer in sequences of length one relative to the comonomer content are determined by 13C NMR analysis according to the state of the art of 13C NMR analysis of propylene based polyolefins.

The 13C-NMR analysis was performed under conditions such that the signal intensity in the spectrum is directly proportional to the total number of contributing carbon atoms in the sample. Such conditions are well known to the skilled person and include for example sufficient relaxation time etc. In practice, the intensity of a signal is obtained from its integral, i.e. the corresponding area. The data were acquired using proton decoupling, several hundred even thousands scans per spectrum, at a temperature of 130° C. The sample was prepared by dissolving a sufficient amount of polymer in 1,2,4-trichlorobenzene (TCB 99% spectroscopic grade) at 130° C. and occasional agitation to homogenize the sample, followed by the addition of hexadeuterobenzene (C6D6, spectroscopic grade) and a minor amount of hexamethyldisiloxane (HMDS, 99.5+%), with HMDS serving as internal standard. To give an example, about 200 to 600 mg of polymer were dissolved in 2.0 ml of TCB, followed by addition of 0.5 ml of C6D6 and 2 to 3 drops of HMDS. The chemical shifts are referenced to the signal of the internal standard HMDS, which is assigned a value of 2.03 ppm.

13C observed signals are assigned according to the comonomer involved and corresponding literature. The following non-exhaustive literature references can be used: G. J. Ray et al. in Macromolecules, vol 10, n° 4, 1977, p. 773-778 and Y. D Zhang et al in Polymer Journal, vol 35, n° 7, 2003, p. 551-559.

The total ethylene content (wt % C2) relative to the total weight of propylene polymer is determined from the appropriate peaks area combination, a well-known method to the skilled person.

With comonomer as ethylene, butene, pentene, hexene, heptene, octene, nonene or decene, the molar fraction of ethylene comonomer in sequences of length 1 relative to the total comonomer content is given by E1/Co (well known to the person skilled in the art): Sbb peaks area (E1) divided by the sum of representative comonomer areas (Co). Representative comonomer areas means the sum of the areas related to the comonomer divided by the number of carbons contributing to that sum of areas.

Sbb peaks correspond to the following structures resulting from the insertion of one ethylene unit between two propylene units, between two comonomer units wherein the comonomer units are not ethylene, or between one propylene and one comonomer wherein the comonomer is not ethylene.

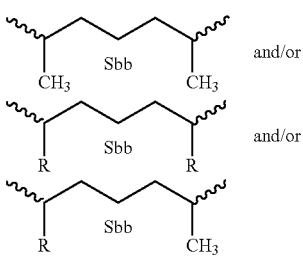

With the Sbb 13C NMR signals in the region of 24-25.5 ppm, wherein R is the lateral chain appearing in the polypropylene chain after insertion of a comonomer other than ethylene, i.e. R is $C_nH_{2n+1}$ wherein n is at least 2.

Melting temperatures were measured on a DSC Q2000 commercialized by TA Instruments calibrated with indium and using T zero mode. The polymer analysis is performed with a 2 to 10 mg polymer sample under conditions well-known in polymer industry.

The imposed thermal history is:
equilibrate at 20 C during 3 minutes;
heat the sample up to 220 C at 20 C./min.
equilibrate at 220 C during 3 minutes
cool the sample up to 20 C at −20 C./min.
equilibrate at 20 C during 3 minutes
heat the sample up to 220° C. at 20 C./min. The enthalpy (calculated using a base line, horizontally from the end of the thermogram, after, if needed, a rotation to horizontal of the raw signal) and molting temperature (temperature at maximum height) are measured during this second heating process.

Stepwise isothermal segregation technique (SIST) is also performed in the same apparatus with 2 to 10 mg polymer. Following program is used.

Equilibrate at 40.00° C. during 3 minutes
Ramp 50.00° C./min to 220.00° C.
Isothermal for 10.00 min
Ramp 50.00° C./min to 140.00° C.
Isothermal for 60.00 min
Ramp 50.00° C./min to 135.00° C.
Isothermal for 60.00 min
Ramp 50.00° C./min to 130.00° C.
Isothermal for 60.00 min
Ramp 50.00° C./min to 12580° C.
Isothermal for 60.00 min
Ramp 50.00° C./min to 120.00° C.
Isothermal for 60.00 min
Ramp 50.00° C./min to 115.00° C.
Isothermal for 60.00 min
Ramp 50.00° C./min to 110.00° C.
Isothermal for 60.00 min
Ramp 50.00° C./min to 105.00° C.
Isothermal for 60.00 min
Ramp 50.00° C./min to 100.00° C.
Isothermal for 10.00 min
Ramp 50.00° C./min to 95.00° C.
Isothermal for 10.00 min
Ramp 50.00° C./min to 90.00° C.
Isothermal for 10.00 min
Ramp 50.00° C./min to 85.00° C.
Isothermal for 10.00 min
Ramp 50.00° C./min to 80.00° C.
Isothermal for 10.00 min
Ramp 50.00° C./min to 75.00° C.
Isothermal for 5.00 min
Ramp 50.00° C./min to 70.00° C.
Isothermal for 5.00 min
Ramp 50.00° C./min to 65.00° C.
Isothermal for 5.00 mm
Ramp 50.00° C./min to 60.00° C.
Isothermal for 5.00 min
Ramp 50.00° C./min to 55.00° C.
Isothermal for 5.00 min
Ramp 50.00° C./min to 50.00° C.
Isothermal for 5.00 min
Ramp 20.00° C./min to 40.00° C.
Equilibrate at 25.00° C.
Beginning of data acquisition
Ramp 5.00° C./min to 180.00° C.
End of data acquisition The raw data were processed as follow. The part of the curve after complete melting was rotated to horizontal. The base line was drawn horizontally from the end of the thermogram. The initial melting temperature (Ti) is the cross over point between the baseline and the thermogram. The melting temperature is the temperature at maximum height of the peak.

From SIST data, the total enthalpy could be measured but also other values like the enthalpy "below Tm−18 C". In this case, in addition to the above-described base-line, the enthalpy is measured by integration of the heat flux signal in watt (divided by the heating rate and normalized based on the weight to obtain the final result in J/g) below the specified temperature, i.e. melting temperature—18 C in this case (See FIG. 1). The value reported in the examples of enthalpy "below Tm−18° C." is divided by the total enthalpy and multiplied by 100 to obtain a percentage.

Regarding the values given in table 2, sealing initiation temperature SIT was measured on a 150 μm thick film made by compression molding. The test was performed according to norm ASTM F 88 and the following parameters were used: temperature: 23° C., specimen width: 15 mm, seal pressure: 40 N, seal time: 9 seconds, peel speed: 200 mm/min, start temperature: 104° C. and end temperature: 120° C. After annealing during 24 hours at 23° C. (50% humidity), a traction is imposed using a Zwick machine on the two 1.5 cm width sealed films (following the ASTM F88 norm), at a traction speed of 200 mm/min. SIT corresponds to the sealing temperature leading to a sealing force between the films of 0.5 N.

The hexane solubles content is determined according to FDA: 21 CFR 177-1520

The film (below 100 μm thickness) sample was cut in 2.5 cm pieces. Weigh 1 gram of sample accurately and place in a 250-milliliter Erlenmeyer flask containing two or three boiling stones. Add 100 milliliters of solvent, attach the flask to the condenser (use no grease), and reflux the mixture for 2 hours. Remove the flask from the heat, disconnect the condenser, and filter rapidly, while still hot, through a small wad of glass wool packed in a short-stem funnel into a tared 150-millimeter beaker. Rinse the flask and filter with two 10-milliliter portions of the hot solvent, and add the rinsing to the filtrate. Evaporate the filtrate on a stream bath with the aid of a stream of nitrogen. Dry the residue in a vacuum oven at 110° C. for 2 hours, cool in a desiccator, and weigh to the nearest 0.0001 gram. Determine the blank on 120 milliliters of solvent evaporated in a tared 150-milliliter beaker. Correct the sample residue for this blank if significant. Calculation:

$$\frac{\text{Grams of residue}}{\text{Grams of sample}} \times 100 = \text{Percent extractable with n-hexane}$$

On BOPP films (values given in table 3), sealing initiation temperature SIT was measured on a 20 μm thick BOPP film. The test was performed according to norm ASTM F 88 and the following parameters were used: temperature: 23° C., specimen width: 15 mm, seal pressure: 40 N, seal time: 3 seconds, peel speed: 200 mm/min, start temperature: 100° C. end temperature: 120° C. After annealing during 24 hours at 23° C. (50% humidity), a traction is imposed using a Zwick machine on the two 1.5 cm width sealed films (following the ASTM F88 norm), at a traction speed of 200 mm/min. SIT corresponds to the sealing temperature leading to a sealing force between the films of 0.5 N.

Hot seal strength (Hot Tack) has been determined in accordance to ASTM F1921—Méthode B.

Tc is the crystallization temperature and is measured by DSC

EXAMPLES

The advantages of the present invention are illustrated by the following representative examples.

Inventive Examples 1-4 and 6

Catalyst Synthesis:

20 g of dry silica (Silica dried at 450° C. for 4 hours under nitrogen fluidization) were added to a 500 mL four necks round bottom flask. 250 mL of dry toluene were added and then 50 mL of MAO (30% w/w in toluene) was added drop wise and the suspension was heated at solvent reflux for 4 h and then filtered, washed with toluene (3×40 mL), isohexane (3×40 mL) and dried in vaccuo overnight.

A 250 mL 3-neck round bottom flask was loaded with 0.025 g of (rac)-dimethylsilyl-bis-(2-methyl-4-phenylindenyl) zirconium dichloride and 0.100 g of diphenylmethane (2-Me-4-tBu-cyclopentadiene-1-yl)(2,7-di-t-butylfluorene-9-yl)zirconium dichloride, 42 mL of triisobutylaluminium (10% in hexane) were added and the solution was stirred 1 h at 20° C. 10 g of support, prepared as described above, were added and the resulting suspension was stirred 2 h at 20° C. The solid was filtered, washed with isohexane (2×30 mL) and dried in vaccuo for 2 h. The powder was obtained and Finavestan A360 oil was added to obtain a 20 wt/wt suspension.

The catalyst used is a bi-site metallocene catalyst wherein the sites have different response to comonomer incorporation, such as to produce a propylene-comonomer block copolymer with a bimodal comonomer distribution.

Synthesis of Propylene-Comonomer Block Copolymer

In Examples 1-4, propylene-comonomer block copolymer were produced in a double loop reactor, whereas in Example 6 propylene-comonomer block copolymer was produced in a single loop reactor. For Examples 1-4 and $6_7$ propylene-comonomer block copolymer were produced with a prepolymerization loop using conditions from table 1 and continuously fed with the catalyst prepared as described above. Triethylaluminum concentration in reactors was maintained at 75 ppm (wt/wt). The comonomer used is ethylene (C2).

Inventive Example 5

The propylene-comonomer block copolymer was produced using 2 wt % of diphenylmethane(2-Me-4-tBu-cyclopentadiene-1-yl)(2,7-di-t-butylfluorene-9-yl)zirconium dichloride supported on G952 from Grace.

Comparative Example CE1

Comparative example 1 (CE1) is a "Ziegler-Natta terpolymer", commercialized by Lyondellbasell under the trade name "Adsyl 5C37F".

Comparative Example CE2

The propylene-comonomer block copolymer of CE2 has been produced with the same catalyst than the inventive example 5, but in polymerisation conditions to have a monomodal comonomer distribution.

Comparative Example CE3

The propylene-comonomer block copolymer of CE3 has been produced with the same catalyst than the inventive example 1-4, but in polymerisation conditions to have a monomodal comonomer distribution.

Characteristics of the obtained propylene-comonomer block copolymer are also presented in table 2. It was surprisingly found that the use of a metallocene catalyst allows the production of clean C3C2-C3C2 block heat seal layer grades having very low hexane solubles content. Moreover, the BOPP produced film has very good optical properties.

TABLE 1

| | | | Exp 1 | Exp 2 | Exp 3 | Exp 4 | Exp 5 | EXP 6 | CE2 | CE3 |
|---|---|---|---|---|---|---|---|---|---|---|
| Pre-polymerization | temperature | ° C. | 20 | 20 | 20 | 25 | 20 | 20 | 20 | 20 |
| | C3 | kg/h | 22.5 | 22.5 | 22.5 | 22.5 | 30 | 22.5 | 22.5 | 22 |
| | H2 | Nl/h | 0.05 | 0.05 | 0.03 | 0 | 1.5 | 0 | 1.2 | 22.5 |
| | Residence time | Min | 10.4 | 10.4 | 10.4 | 10.4 | 8 | 10.4 | 10.4 | 10.4 |
| 1st reactor | temperature | ° C. | 70 | 70 | 70 | 68 | 66 | 55 | 55 | 55 |
| | C3 | kg/h | 48 | 48 | 48 | 58 | 45 | 45 | 50 | 50 |
| | C2 | kg/h | 0.95 | 1.09 | 0.6 | 0.7 | 0.32 | 1.4 | 1 | 0.8 |
| | H2 | Nl/h | 7.1 | 6.3 | 5.2 | 12 | 6 | 17.2 | 7.8 | 7.9 |
| Product obtained from 1st reactor | Tm (DSC) | ° C. | 127 | 124 | 130 | 130 | 133 | | | |
| | C2 content (NMR) | wt % | 2.3 | 2.8 | 1.7 | 1.7 | 1.2 | | 2.4 | 1.2 |
| | MFI | g/10' | 5.1 | 4.1 | 4.5 | 11.5 | 9.6 | | 9.6 | 10.8 |

Process conditions for production of examples

TABLE 1-continued

Process conditions for production of examples

|  |  |  | Exp 1 | Exp 2 | Exp 3 | Exp 4 | Exp 5 | EXP 6 | CE2 | CE3 |
|---|---|---|---|---|---|---|---|---|---|---|
| 2nd reactor | temperature | ° C. | 70 | 70 | 70 | 68 | 66 | — | — | — |
|  | C3 | kg/h | 42.5 | 42.5 | 42.5 | 32.5 | 50 | — | — | — |
|  | C2 | kg/h | 0.78 | 0.963 | 0.954 | 0.68 | 1.2 | — | — | — |
|  | H2 | Nl/h | 7.1 | 6.3 | 6.5 | 0 | 8.5 | — | — | — |
| Split[1] |  |  | 60/40 | 61/39 | 58/42 | 70/30 | 40/60 | — | — | — |

[1] the split refers to the split or ratio between the comonomer block having High melting temperature Tm and the block having low melting temperature Tm. Said splits were determined by measuring the amount of residual zirconium in samples from first loop and in final polymer by ICP-AES.

TABLE 2

Resin properties

|  |  | Exp 1 | Exp 2 | Exp 3 | Exp 4 | Exp 5[4] | EXP 6 | CE1 (5C37F from LBI) | CE2* | CE3* |
|---|---|---|---|---|---|---|---|---|---|---|
| MFI | g/10' | 5.21 | 4.93 | 4.3 | 6.75 | 13.6 | 12.1 | 5.8 | 9.1 | 11.3 |
| Comonomer content (NMR) | wt % | 2.8 | 3.4 | 2.7 | 2.4 | 2.4 | 3.8 | 9.7 | 2.4 | 1.4 |
| E1/Co (NMR) |  | 0.91 | 0.91 | 0.91 | 0.91 | 0.91 | 0.91 | 0.38 | 0.91 | 0.91 |
| Tm (DSC) | ° C. | 124 | 121.2 | 128.4 | 129.9 | 133 | 121 | 133.5 | 126.1 | 135.3 |
| Tc (DSC) | ° C. | 87.2 | 81.9 | 89.8 | 91.7 | 83.7 | 84.8 | 95.6 | 87.9 | 98.1 |
| Melting enthalpy (DSC) | J/g | 62.2 | 51.7 | 51.5 | 58.2 | 70.9 | 53.5 | 57.9 | 59.3 | 78.5 |
| Melting enthalpy below Tm−18° C. (SIST) | % of total enthalpy | 29.1 | 34.2 | 27.6 | 23.7 | 22.3 | 35.6 | 57.5 | 18.2 | 8.6 |
| Hexane solubles | % wt | 0.350 | 0.443 | 0.315 | 0.436 | ND | ND | 2.940 | ND | ND |
| Mn (GPC) | KDa | 91 | 95 | 94 | 83 | 85 | 72 | 50 | 81 | 70 |
| Mw (GPC) | KDa | 235 | 245 | 256 | 237 | 191 | 184 | 297 | 204 | 198 |
| Mz (GPC) | KDa | 458 | 476 | 522 | 499 | 355 | 343 | 1098 | 376 | 379 |
| Mw/Mn (GPC) |  | 2.6 | 2.6 | 2.7 | 2.9 | 2.3 | 2.5 | 5.9 | 2.5 | 2.8 |
| Mz/Mw (GPC) |  | 1.9 | 1.9 | 2.0 | 2.1 | 1.9 | 1.9 | 3.7 | 1.9 | 1.9 |
| SIT[3] 0.5N | ° C. | 112 | 109 | 115 | 117 | 115 | 107 | 109 | 115 | 124 |
| Stickiness[2] |  | N | N | N | N | N | N | N | Y | N |

*CE2 and CE3 are monomodal copolymer.
[2] N indicates that the produced copolymer does not stick to the apparatus used for further processing of said copolymer. Y indicates that the produced copolymer is sticking to the apparatus used for further processing of said copolymer.
ND = non-determined.
[3] SIT measured on compression moulded films Comparative example 2 (CE2), consisting of the propylene-comonomer block having low melting temperature, shows that an increase of C2 in monomodal polymer induces stickiness on the chill-roll of the BOPP line. Without being bound by any theory it is believed that the inventive examples 1, 2 and 6 showing similar of lower melting temperature do not stick the apparatus due to their bimodal comonomer distribution which result in a mix of polymer of different melting temperatures.

Comparative example 3 (CE3), consisting of the first propylene-comonomer block having high melt temperature, has a high SIT compared to the examples according to the present invention.

It is shown from table 2 that it is desirable to have high percentage of enthalpy measured between Ti and [Tm−18° C.] to achieve good sealing properties. Moreover, high E1/Co is desirable to achieve good hot tack properties and low hexane solubles.

Production of BOPP Films 3-layers, 20 microns thick BOPP films were produced from some example resins on a BOPP pilot line (tenter process). Applied draw ratios were 4.5 and 6.6 in machine and transverse directions, respectively. The core layer (about 17 microns thick) consists of a PP homopolymer and skin layers (about 1.5 micron thick on each side) consist of the example resins.

The PP homopolymer used as core layer in the examples has the following properties:

Melt flow index of 3.3 g/10 min (determined by ISO 113)

Melting point of 165° C. (determined according to ISO 3146)

The characteristics of BOPP films produced are given in the below table 3

TABLE 3

Characteristics of BOPP films produced from examples

|  |  | Exp 1 | Exp 2 | Exp 3 | Exp 4 | CE1 (5C37F from LBI) |
|---|---|---|---|---|---|---|
| SIT 0.5N[1] | ° C. | 105 | 102 | 106 | 106 | 106 |
| Hot tack[2] |  |  |  |  |  |  |
| Maximum Seal Force (MSF) | N | 4.7 | 4.8 | 5.3 | 3.4 | 3.0 |

TABLE 3-continued

Characteristics of BOPP films produced from examples

|  |  | Exp 1 | Exp 2 | Exp 3 | Exp 4 | CE1 (5C37F from LBI) |
|---|---|---|---|---|---|---|
| Sealing Temperature at MSF | °C. | 125 | 120 | 125 | 125 | 140 |
| Hot tack window at 2.0 N[3] | °C. | 108 to 133 | 107 to 132 | 113 to 142 | 121 to 143 | 116 to 145 |
| Hot tack window at 2.5 N[3] | °C. | 118 to 132 | 116 to 130 | 120 to 139 | 122 to 138 | 128 to 143 |

Figure 3:
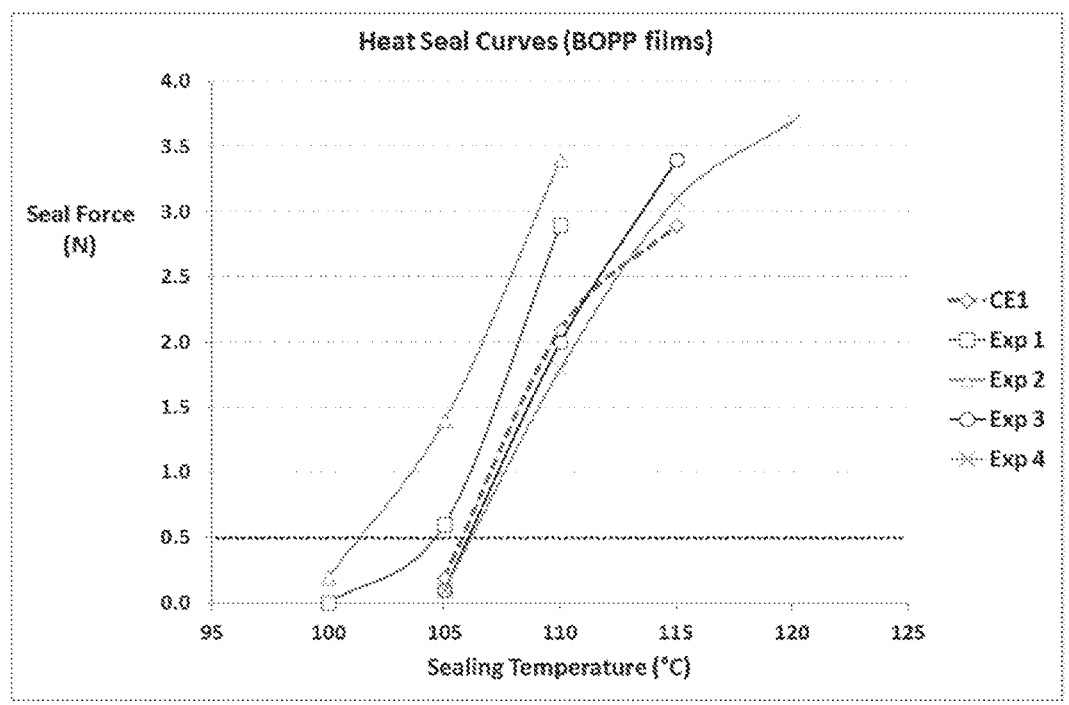
FIG. 3 provides heat seal curves for BOPP films produced with propylene-comonomer block copolymer in accordance with the invention, and in accordance with comparative example CE1.
Figure 4:
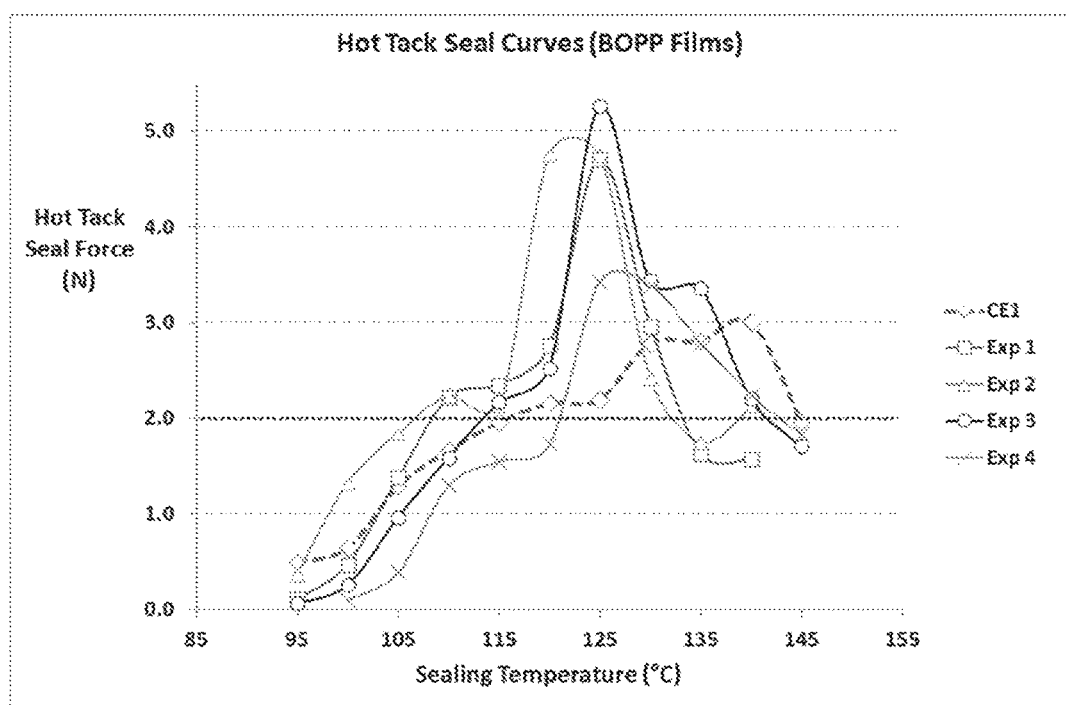
FIG. 4 provides hot tack seal curves for BOPP films produced with propylene-comonomer block copolymer in accordance with the invention, and in accordance with comparative example CE1.

[1]SIT measured on BOPP films; cf FIG. 3Hot Tack Seal Force measured on BOPP films; cf FIG. 4Range of sealing temperatures enabling a minimum hot tack seal force of 2.0 or 2.5 N Maximum sealing force (MSF) is determined graphically (cf FIG. 4)

For similar SIT values, it can be seen that the BOPP films produced from the propylene-comonomer block copolymer of the invention show an improvement in hot tack properties compared to BOPP film produced from CE1. Indeed, it can be seen that the maximum seal force has been improved whereas the sealing temperature at MSF has been lowered. A shift of the hot tack window to lower temperatures compared to CE1 has also been obtained.

The invention claimed is:

1. A bimodal propylene-comonomer block copolymer having a molecular weight distribution Mw/Mn of at least 1.7; a percentage of enthalpy measured between Ti and [Tm−18° C.] of at least 20% of the total enthalpy, wherein the total enthalpy is determined by stepwise isothermal segregation technique SIST, Ti is the initial melting temperature of the bimodal propylene-comonomer block copolymer and Tm is the melting temperature of the bimodal propylene-comonomer block copolymer, as measured by differential scanning calorimetry (DSC); and a ratio E1/Co of at least 0.80, wherein the ratio is determined by 13C-NMR analysis and is the molar fraction of ethylene comonomer in sequences of length 1 relative to the total comonomer content, wherein the sequences of length 1 correspond to the following structures:

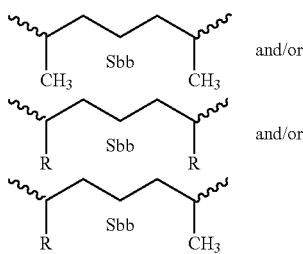

wherein R is the lateral chain appearing in the polypropylene chain after insertion of a comonomer other than ethylene, wherein R is $C_nH_{2n+1}$ wherein n is at least 2;
wherein the bimodal propylene-comonomer block copolymer has a first propylene copolymer block having a melting temperature of at least 90° C. and at most 160° C., and a second propylene copolymer block having a melting point of at least 60° C. and at most 100° C., wherein neither the melting temperature of the first propylene copolymer block nor the melting point of the second copolymer block are used to measure the percentage of enthalpy;

wherein the bimodal propylene-comonomer block copolymer has a hexane solubles content of at most 2 weight percent; and
wherein the bimodal propylene-comonomer block copolymer comprises at least 0.1 weight percent of comonomer, wherein at least 80% of the comonomer is ethylene.

2. The bimodal propylene-comonomer block copolymer according to claim 1, wherein the comonomer comprises ethylene, butene, pentene, hexene, heptene, octene, nonene, decene, or any mixture thereof.

3. The bimodal propylene-comonomer block copolymer according to claim 1, wherein the molecular weight distribution Mw/Mn is at most 8.

4. The bimodal propylene-comonomer block copolymer according to claim 1, wherein the percentage of enthalpy measured between Ti and [Tm−18° C.] is at least 22% of total enthalpy.

5. The bimodal propylene-comonomer block copolymer according to claim 1, wherein the melt flow rate of the bimodal propylene-comonomer block copolymer is from 0.1 to 15 g/10 min, wherein the melt flow rate is measured according to ISO1133.

6. The bimodal propylene-comonomer block copolymer according to claim 1, wherein the melting temperature, measured by differential scanning calorimetry, is at least 110° C. and at most 150° C.

7. The bimodal propylene-comonomer block copolymer according to claim 1, wherein the bimodal propylene-comonomer block copolymer has a seal initiation temperature measured according to ASTM F88, of at most 130° C.

8. The bimodal propylene-comonomer block copolymer according to claim 1, wherein the bimodal propylene-comonomer block copolymer has a hexane solubles content of at most 1 wt %.

9. A process for the production of a bimodal propylene-comonomer block copolymer comprising:
polymerizing propylene in the presence of at least one comonomer and a bridged metallocene catalyst comprising bridged fluorenyl, bridged indenyl metallocene, or any combination thereof;
wherein the bimodal propylene-comonomer block copolymer has a molecular weight distribution Mw/Mn of at least 1.7; a percentage of enthalpy measured between Ti and [Tm−18° C.] of at least 20% of the total enthalpy, wherein the total enthalpy is determined by stepwise isothermal segregation technique SIST, Ti is the initial melting temperature of the bimodal propylene-comonomer block copolymer and Tm is the melt-ing temperature of the bimodal propylene-comonomer block copolymer, as measured by differential scanning calorimetry (DSC); and a ratio E1/Co of at least 0.80, wherein the ratio is determined by 13C-NMR analysis and is the molar fraction of ethylene comonomer in sequences of length 1 relative to the total comonomer content, wherein the sequences of length 1 correspond to the following structures:

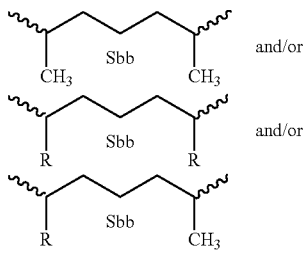

and/or
and/or wherein R is the lateral chain appearing in the polypropylene chain after insertion of a comonomer other than ethylene, wherein R is $C_nH_{2n+1}$ wherein n is at least 2; wherein the bimodal propylene-comonomer block copolymer has a first propylene copolymer block having a melting temperature of at least 90° C. and at most 160° C., and a second propylene copolymer block having a melting point of at least 60° C. and at most 100° C., wherein neither the melting temperature of the first propylene copolymer block nor the melting point of the second copolymer block are used to measure the percentage of enthalpy;

wherein the bimodal propylene-comonomer block copolymer has a hexane solubles content of at most 1 weight percent; and wherein the bimodal propylene-comonomer block copolymer comprises at least 0.1 weight percent of comonomer, wherein at least 80% of the comonomer is ethylene.

10. The process according to claim 9, wherein the comonomer comprises ethylene, butene, pentene, hexene, heptene, octene, nonene, decene, or any mixture thereof.

11. The process according to claim 9, wherein the polymerization is carried out in at least two reactors.

12. A process comprising forming the bimodal propylene-comonomer block copolymer of claim 1 as a heat seal layer in biaxially oriented multi-layer films.

13. A biaxially oriented multi-layer film comprising at least one heat seal layer made of the bimodal propylene-comonomer block copolymer of claim 1.

* * * * *